Figure 1:
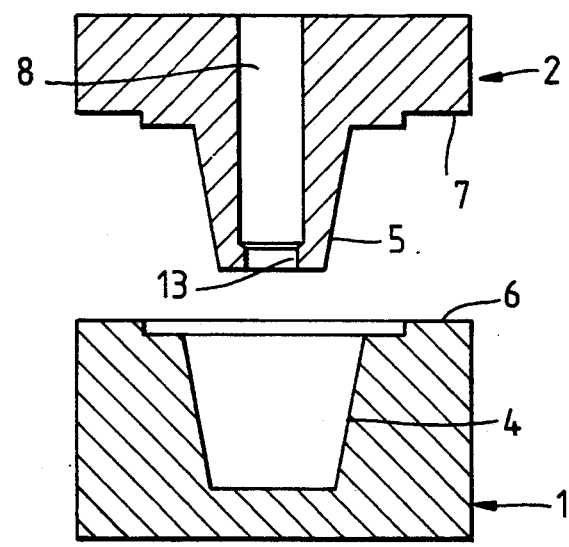

United States Patent [19]
Binley

[11] Patent Number: 5,409,722
[45] Date of Patent: Apr. 25, 1995

[54] METHOD OF PREPARING FAT-CONTAINING PRODUCTS

[75] Inventor: Gary N. Binley, Kettering, United Kingdom

[73] Assignee: Good Humor Corporation, Englewood Cliffs, N.J.

[21] Appl. No.: 154,688

[22] Filed: Nov. 18, 1993

[30] Foreign Application Priority Data

Nov. 20, 1992 [EP] European Pat. Off. ........... 92310634

[51] Int. Cl.6 .............................................. A23G 1/00
[52] U.S. Cl. ................................. 426/515; 426/660
[58] Field of Search ............. 426/515, 514, 138, 660; 425/547

[56] References Cited

U.S. PATENT DOCUMENTS

| | | | |
|---|---|---|---|
| 3,798,337 | 3/1974 | Abalo | 426/515 |
| 4,421,773 | 12/1983 | Akutagawa | 426/515 |
| 4,426,402 | 1/1984 | Kaupert | 426/515 |
| 4,875,518 | 10/1989 | Imura et al. | 164/119 |

FOREIGN PATENT DOCUMENTS 2222202 10/1974 France.
1448511 9/1976 United Kingdom.

OTHER PUBLICATIONS

International Search Report in International Application No. PCT/EP 93/03214.
Kirk–Othmer (2nd Edition, 1964), p. 363.
Elements of Food Technology, p. 579.

Primary Examiner—George Yeung
Attorney, Agent, or Firm—James J. Farrell

[57] ABSTRACT

Invention provides method of moulding fat containing materials, especially chocolate, in separable moulds having different heat conductivities. The two parts are preferably held at below 0° C., preferably below −10° C.

11 Claims, 1 Drawing Sheet

METHOD OF PREPARING FAT-CONTAINING PRODUCTS

FIELD OF THE INVENTION

This invention relates to the production of fat containing products, especially chocolate products, in which molten fat containing mass is introduced into a mould to provide shaped solids. The invention is particularly applicable to products having a relatively thin thickness. These products are normally termed "shells". After solidification the solid product, eg the shell, on removal from the mould, replicates the surface finish on the mould. The resultant products, particularly if they are in shell form, may be available for filling with a suitable edible composition, in particular frozen confections, eg sorbets, yoghurts, water ices and ice cream.

BACKGROUND TO THE INVENTION

When preparing fat containing products, eg chocolate products, with the aid of moulds it is necessary to obtain the final product in a simple manner and without breakage. It is known to obtain chocolate products, in particular those in the form of shells, by introducing a mass of molten chocolate into a mould. After allowing that part of the chocolate mass in contact with the mould surface to solidify the mould is inverted and the remaining liquid mass falls in a reservoir. The resultant shell can then be removed from the mould or filled in situ. Another route to obtaining a chocolate shell is spin moulding in which a measured dose of chocolate is filled into one half of a hinged mould pair and the halves closed to complete the product shape. The closed mould is then spun on several axis to distribute the chocolate evenly on the mould wall where it solidifies to form a complete shell. After opening the mould, the resultant shell can then be removed or filled in situ through a small hole in the shell wall. However production lines of recent design require a supply of components which are of consistent quality, thus avoiding rework, and size and provided regularly at short time intervals. The inverting mould route does not provide chocolate products with these properties; spin moulding requires the shell to be filled through a small hole and thus the types of ingredients are limited.

The term "chocolate" is used herein generally to include fat based compositions having a chocolate component and extends to couvertures. Such compositions are well characterised in the literature, examples are Kirk-Othmer (2nd Edition, 1964) at pages 363 et seq and Elements of Food Technology page 579 et seq. There is a general problem is obtaining reproducible mould release when a product has to be released from two, or more, surfaces. Frequently the product will fail to separate cleanly from both surfaces so a broken product is obtained with consequent need to handle and rework.

Literature

U.S. Pat. No. 4,426,402 (Kaupert) describes the manufacture of chocolate forms between separate moulds. Ejector pins are used to separate the chocolate shell from one mould surface. The mould parts are held at different temperatures.

GENERAL DESCRIPTION OF THE INVENTION

The invention provides a method of preparing fat-containing products, in particular chocolate products, using two separable moulds which, when together, define a closed cavity adapted to receive a molten fat-containing mass.

Solid fat containing products are prepared by moulding between two separable mould surfaces, which define a closed cavity, in the steps:

(i) introducing a fat containing, preferably chocolate, mass at a temperature in the range from about 28° C. to about 55° C. and having a fat content of at least about 25%, preferably to about 60%, into the cavity between the separable mould surfaces, which surfaces have different thermal conductivities, (ii) retaining the fat containing mass in contact with the mould surfaces for a time sufficient to allow it to solidify, and (iii) separating the mould surfaces and removing the fat containing product.

The method can be applied to tempered chocolate but untempered chocolate is the preferred feedstock. The fat containing material may contain more than 60% fat, examples are cocoa butter and a couverture with a fat content of 64% and a crystallisation temperature of 12° C. An example of a material containing less than 60% fat is a couverture containing 46% fat (cocoa butter, dairy fat and coconut oil).

It is preferred to have at least one of the mould surfaces below 0° C., preferably below −10° C., to provide rapid solidification of the chocolate. However the process can be operated at ambient temperatures say 20° C. or temperatures between ambient and freezing. The method in which each surface is below 0° C. to about −40° C. is preferred. If one surface is at or above ambient then it is necessary the other surface has better heat transfer. Commercial equipment can provide temperatures down to −40° C., but lower levels are obtained using liquid nitrogen and other cryogenic materials.

The particular feature of the invention is providing the two mould surfaces capable of providing differential heat transfer from the chocolate in the cavity. This is achieved by using materials having different heat transfer coefficients, for example a metal and a plastics material, eg aluminium and polycarbonate. The fat containing mass then solidifies first in contact with the surface with the higher heat transfer coefficient. This process is effective even when the mould parts are held at the same temperature, eg −10° C., because the fat containing separates from the mould with the higher conductivity.

The two mould parts are required to have different thermal conductivities and the lower conductivity is preferably below 3 W/m/K and more preferably below 1 W/m/K. This mould part will usually be the lower one with the upper mould part having the higher conductivity. This arrangement will lead to separation of the upper mould surface first. Preferably the mould part of higher conductivity will have a conductivity above 10 W/m/K, more preferably above 50 W/m/K. These values can be selected to provide effective operation given the type of fat-containing material to be moulded and the other characteristics of the production line. Although the difference between thermal coefficients should be maximised, an effect will be obtained if the ratio between the coefficients is at least 10, preferably it is at least 30, and more preferably at least 50.

The process of the invention does not require use of ejector pins to obtain separation of the first mould part and does not require the use of special surfaces to obtain release.

SPECIFIC DESCRIPTION OF THE INVENTION

Figure 2:
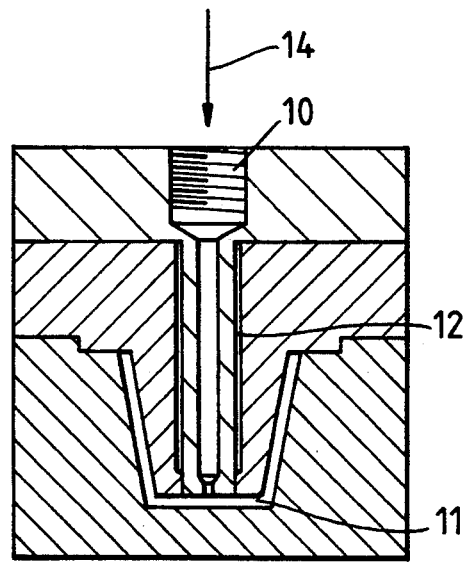

Examples of the method of the invention will now be described to illustrate the invention and reference is made to the accompanying diagrammatic drawings in which:

FIG. 1 is an axial sectional view of the three separated components of the die, and FIG. 2 is an axial sectional view of the components nested to form the injection die.

EXAMPLE I

The die is formed by an outer die part 1, an inner die part 2 and an insert 3. The die parts are of aluminium, which is the preferred metal, to allow them to be operated below 0° C. in association with cooling devices. Aluminium is the preferred metal because of thermal conductance properties. If one of the dies is constructed of a less conductive material, eg a polycarbonate, the temperatures can be the same. Insert 3 is made from a plastics material to provide insulation for the chocolate stream when injecting into the mould. Aluminium has a thermal conductivity of 147.0 W/m/K and polycarbonate a value of 0.2 W/m/K. Another higher conductivity material is stainless steel (16.3 W/m/K).

Die part 1 has cylindrical form with an inner side wall 4 of frusto-conical shape. When die part 2 is mated with part 1, with surfaces 6 and 7 in plane contact, wall 4 forms together with outer wall 5 a mould space 11. The central channel 8 in part 2 is adapted to receive injection rod 9 of part 3. The lower, distant, end of rod 9 contacts and is retained by an inwardly directed collar 13 adjacent channel 8 so that a cylindrical insulation space 12 is formed. When assembled as shown in FIG. 2 the connection 10 on insert 3 allows a supply of molten chocolate to be provided from direction 14.

Molten untempered chocolate having a fat content of 43% and at a temperature of 45° C. was injected at about 3 bar into space 11 through injection rod 9 using a piston feed operating through connection 10. The outer die part 1 was at −5° C. and the inner part 2 at −25° C. to ensure the shell remained in the outer part. This arrangement gave the option of filling the shell with a frozen confection before removing it from the part 1. Removal is achieved by a pin extending through part 1 to contact the shell. The solidification of the shell is rapid and thus the die parts can be separated seconds after injecting the chocolate. The thickness of the shell was 1.5 mms, but this method is applicable to shells of other thickness without departing from the general description.

EXAMPLE II

Example I was repeated with the outer die part 1 made of polycarbonate and held at ambient during the moulding process. The other components were as previously described with the aluminium inner die part 2 held at −26° C. The chocolate mass solidified in about 2 seconds to a degree allowing the shell to separate from the inner die part. The shell was then available to be filled while in the outer die part or removed for subsequent processing.

I claim:

1. A method of preparing fat-containing products by moulding between two separable mould surfaces defining a closed cavity comprising the steps of:
    i) introducing a fat containing mass at a temperature in the range from about 28° C. to about 55° C. and having a fat content of at least about 25% into the cavity between the separable mould surfaces, which surfaces have different thermal conductivities,
    ii) retaining the fat containing mass in contact with the mould surfaces for a time sufficient to allow it to solidify, and
    iii) separating the mould surfaces and removing the fat containing product.

2. A method according to claim 1 wherein the fat containing mass contains up to 60% fat.

3. A method according to claim 1 wherein the fat containing mass is a chocolate.

4. A method according to claim 1 wherein the fat containing mass has not been subjected to tempering.

5. A method according to claim 1 wherein one mould surface is at a temperature below 0° C.

6. A method according to claim 1 wherein each mould surface is at a temperature from below about 0° C. to about −40° C.

7. A method according to claim 1, wherein one of the two mould surfaces is at a temperature different from the other so the fat containing mass in the cavity is subjected to differential heat transfer to the surfaces.

8. A method according to claim 7 wherein
    (i) the mold surfaces comprise an upper mold surface and a lower mold surface and
    (ii) the fat containing mass solidifies first on, and separates from, the upper mold surface so that a shell is retained in the lower mold surface.

9. A method according to claim 1 wherein one mold surface has a thermal conductivity below 3 W/m/K and the other mold surface has a thermal conductivity above 10 W/m/K.

10. A method according to claim 9 wherein the one mold surface has a thermal conductivity below 1 W/m/K.

11. A method according to claim 9 wherein the other mold surface has a thermal conductivity above 50 W/m/K.

* * * * *